United States Patent [19]

Itoh et al.

[11] Patent Number: 4,960,538
[45] Date of Patent: Oct. 2, 1990

[54] 1,2-NAPHTHALOCYANINE NEAR-INFRARED ABSORBENT AND RECORDING/DISPLAY MATERIALS USING SAME

[75] Inventors: Hisato Itoh; Takahisa Oguchi, both of Yokohama; Katashi Enomoto, Zushi; Masakatsu Nakatsuka; Tsutomu Nishizawa, both of Yokohama, all of Japan

[73] Assignees: Mitsui Toatsu Chemicals, Inc, Tokyo; Yamamoto Chemicals, Inc., Yao, both of Japan

[21] Appl. No.: 260,038

[22] Filed: Oct. 20, 1988

[30] Foreign Application Priority Data

Oct. 20, 1987 [JP] Japan ............................. 62-262593
Apr. 12, 1988 [JP] Japan ............................. 63-90030

[51] Int. Cl.$^5$ ...................... C09K 19/58; C09B 47/04
[52] U.S. Cl. ............................. 252/299.2; 252/299.5; 252/587; 252/589; 252/600; 252/299.1; 350/1.1; 350/330; 540/129; 540/130; 540/136; 540/139
[58] Field of Search ............. 252/299.1, 299.5, 299.01, 252/582, 299.2, 600, 587, 589; 540/129, 139, 140, 135, 136, 122, 130; 350/349, 1.1, 330

[56] References Cited

U.S. PATENT DOCUMENTS 4,400,173  8/1983  Beavan ................................. 8/107
4,606,859  8/1986  Duggan et al. ................... 540/122
4,622,179 11/1986  Eda ..................................... 540/139
4,648,992  3/1987  Graf et al. ......................... 540/124
4,657,554  4/1987  Reinert et al. ....................... 8/107
4,766,054  8/1988  Hirose et al. ..................... 430/270
4,769,307  9/1988  Ozawa et al. .................... 430/270
4,783,386 11/1988  Nikles et al. ....................... 430/19
4,784,736 10/1988  Lonsdale et al. ............... 204/157.15
4,814,256  3/1989  Aldag et al. ...................... 430/270

FOREIGN PATENT DOCUMENTS 0134518  3/1985  European Pat. Off. .

OTHER PUBLICATIONS

Dieng, M. et al., J. de Chimie Physique, 1987, 84, No. 4, p. 519.
Savy, M. et al., J. Electrochem Soc., Jul. 1982, p. 1409.
Hanack, M. et al., Chem. Ber. 121, 1479, 1988.

Primary Examiner—John S. Maples
Assistant Examiner—Richard Treanor
Attorney, Agent, or Firm—Oblon, Spivak, McClelland, Maier & Neustadt

[57] ABSTRACT

Disclosed are near-infrared absorbents comprising 1,2-naphthalocyanine derivatives wherein the four naphthalene rings contained in the molecule independently have 1 to 6 substituents. Also disclosed is the use of these near-infrared absorbents in optical recording media, near-infrared absorption filters and display materials.

16 Claims, No Drawings

1,2-NAPHTHALOCYANINE NEAR-INFRARED ABSORBENT AND RECORDING/DISPLAY MATERIALS USING SAME

BACKGROUND OF THE INVENTION

1. Field of the Invention:

This invention relates to 1,2-naphthalocyanine derivatives serving as near-infrared absorbents which are used as optoelectronic materials, as well as optical recording media, near-infrared absorption filters and display materials using such near-infrared absorbents.

2. Description of the Prior Art:

In recent years, near-infrared absorbents are being used as optoelectronic materials in the manufacture of optical recording media, optical cards, laser printers, near-infrared absorption filters, goggles and the like.

Conventionally known near-infrared absorbents include cyanine dyes (Japanese Patent Laid-Open Nos. 46221/'81 and 112790/'83), phthalocyanine dyes (Japanese Patent Laid-Open No. 36490/'83), naphthoquinone dyes (Japanese Patent Laid-Open No. 15458/'85), anthraquinone dyes (Japanese Patent Laid-Open No. 291651/'86) and dithiol complexes (Japanese Patent Laid-Open No. 175693/'83).

However, these conventional dyes have major disadvantages. Specifically, cyanine dyes are insufficient in fastness properties such as light resistance and thermal resistance. The absorption wavelength range of phthalocyanine dyes is as short as 600–700 nm. Anthraquinone and naphthoquinone dyes have a low molar extinction coefficient of the order of several tens of thousands. Dithiol complexes are insufficient in thermal stability and molar extinction coefficient.

Moreover, 2,3-naphthalocyanine dyes, which are analogous to the near-infrared absorbents of the present invention, have an absorption band at 750 to 800 nm in the dissolved state and absorb light from semiconductor lasers. However, when they are in the form of a film or solid, their absorption band is shifted and the absorption of light (in the wavelength range of 780 to 830 nm) from semiconductor lasers is diminished.

SUMMARY OF THE INVENTION

It is an object of the present invention to provide near-infrared absorbents which absorb light in the near-infrared region of 700 to 850 nm and have excellent light resistance, weather resistance and thermal resistance.

It is another object of the present invention to provide optical recording media containing such a near-infrared absorbent in the recording layer thereof, a near-infrared absorption filter containing such a near-infrared absorbent, and display materials comprising a mixture of such a near-infrared absorbent and liquid crystal materials.

According to the present invention, there is provided near-infrared absorbents comprising 1,2-naphthalocyanine derivatives of the formula

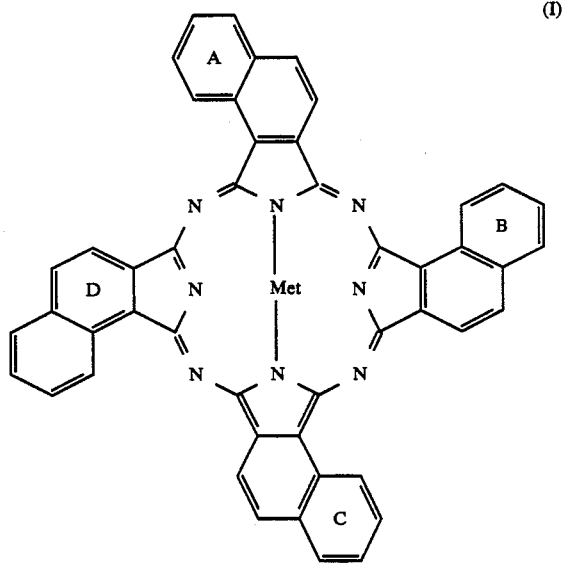

where the naphthalene rings represented by A, B, C and D may independently have 1 to 6 substituents selected from substituted or unsubstituted alkyl groups, alkoxy groups, alkylthio groups, alkylamino groups, dialkylamino groups, aryl groups, aryloxy groups, arylthio groups, arylamino groups and halogen atoms, and the substituents may be connected with each other; and Met represents two hydrogen atoms, a divalent metal atom, a monosubstituted trivalent metal atom, a disubstituted tetravalent metal atom or an oxymetal group.

These near-infrared absorbents may be used to produce optical recording media containing them in the recording layer thereof, near-infrared absorption filters containing them, and display materials comprising mixtures of them and liquid crystal materials.

DESCRIPTION OF THE PREFERRED EMBODIMENTS

The 1,2-naphthalocyanine derivatives of formula (I) which constitute the near-infrared absorbents of the present invention can be synthesized as follows: One to four intermediates are selected from the compounds represented by the formulas

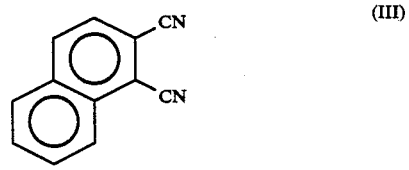

and

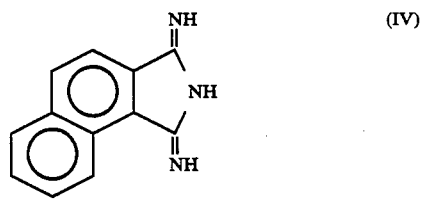

where the naphthalene ring may have one or more substituents similar to those defined for formula (I). In the same manner as for the synthesis of phthalocyanines, the said intermediate or intermediates are reacted, for example, by heating in butanol in the presence of 1,8-diazabicyclo[5,4,0]-7-undecene (DBU). Thus, there can be obtained 1,2-naphthalocyanine derivatives of formula (I).

The substituents which may be possessed by each naphthalene ring will be more specifically described hereinbelow.

Examples of the substituted or unsubstituted alkyl groups with which the naphthalene rings in formula (I) may be substituted include straight-chain or branched hydrocarbon radicals having 1 to 20 carbon atoms; straight-chain or branched alkoxyalkyl groups having a total of 1 to 30 carbon atoms, such as methoxymethyl, ethoxymethyl, methoxyethyl, ethoxyethyl, propoxyethyl, methoxybutyl and phenoxyethyl groups; straight-chain or branched alkylthioalkyl groups having a total of 1 to 30 carbon atoms, such as methylthiomethyl, ethylthioethyl and methylthiobutyl groups; straight-chain or branched alkylaminoalkyl groups having a total of 1 to 30 carbon atoms, such as N-methylaminomethyl, N,N-dimethylaminomethyl, N,N-diethylaminomethyl, N-butylaminomethyl, N,N-dibutylaminomethyl and N,N-dimethylaminoethyl groups; arylthioalkyl groups such as phenylthiomethyl, phenylthioethyl and naphthylthiomethyl groups; halogenoalkyl groups having 1 to 20 carbon atoms, such as chloromethyl, chloroethyl, chlorobutyl, fluoromethyl, fluoroethyl, bromomethyl, bromoethyl, bromobutyl, iodomethyl, iodoethyl and iodobutyl groups; perhalogenoalkyl groups such as trifluoromethyl, trichloromethyl, dibromomethyl, pentafluoroethyl and heptafluoropropyl groups; and aralkyl groups such as benzyl and phenylethyl groups.

Examples of the substituted or unsubstituted alkoxy groups include straight-chain or branched hydrocarbonoxy groups having 1 to 20 carbon atoms, such as methoxy, ethoxy, propoxy, butoxy pentyloxy, hexyloxy, heptyloxy and octyloxy groups; oligoethyloxy derivatives of the general formula R-(OCHY$^1$CHY$^2$)$_n$-O- (where R represents a hydrogen atom or a hydrocarbon radical having 1 to 6 carbon atoms, Y$^1$ and Y$^2$ independently represent hydrogen atoms, methyl groups, chloromethyl groups or alkoxymethyl groups, and n is a whole number of 1 to 5), such as methoxyethoxy, ethoxyethoxy, propoxyethoxy, butoxyethoxy, phenoxyethoxy, methoxyethoxyethoxy, ethoxyethoxyethoxy, methoxyethoxyethoxyethoxy, hydroxyethyloxy and hydroxyethoxyethoxy groups; alkylaminoalkoxy groups such as N,N-dimethylaminoethoxy, N,N-diethylaminoethoxy, N,N-dimethylaminopropoxy groups; alkylthioalkoxy groups such as ethylthioethoxy, methylthioethoxy, methylthiopropoxy and ethylthiopropoxy groups; arylthioalkoxy groups such as phenylthioethoxy and phenylthiopropoxy groups.

Examples of the substituted or unsubstituted alkylthio groups include straight-chain or branched hydrocarbonthio groups having 1 to 30 carbon atoms, such as methylthio and ethylthio groups; oligoalkoxyalkylthio groups such as methoxymethylthio, methoxyethylthio, ethoxyethylthio, butoxyethylthio and methoxyethoxyethylthio groups; oligoalkylthioalkylthio groups such as methylthiomethylthio and ethylthioethylthio groups; alkylaminoalkylthio groups such as N,N-dimethylaminoethylthio, N,N-diethylaminoethylthio and N-methylaminopropylthio groups; and halogenated alkylthio groups such as chloroethylthio, bromoethylthio, iodoethylthio, fluoroethylthio and dichloroethylthio groups.

Examples of the substituted or unsubstituted alkylamino and dialkylamino groups include straight-chain or branched alkyl-substituted amino groups having a total of 1 to 30 carbon atoms, such as methylamino, ethylamino, N,N-dimethylamino and N,N-diethylamino groups; hydroxyalkylamino groups such as N-(hydroxyethyl)amino and N,N-di(hydroxyethyl)amino groups; alkoxyalkylamino groups such as N,N-di(methoxyethyl)amino, N,N-di(ethoxyethyl)amino and N,N-di(methoxyethoxyethyl)amino groups; and acyloxyalkylamino groups such as N,N-di(acetoxyethyl)amino group.

Examples of the substituted or unsubstituted aryl groups include substituted or unsubstituted phenyl and naphthyl derivatives such as phenyl, naphthyl and tolyl groups; and substituted or unsubstituted heterocyclic radicals derived from thiophene, oxazole, thiazole, thiadiazole, furan, pyrrole, quinoline and pyridine.

Examples of the substituted or unsubstituted aryloxy groups include phenyloxy, naphthyloxy, alkylphenyloxy, alkylaminophenyloxy, halogen-substituted phenyloxy, nitrophenyloxy, alkoxyphenyloxy and alkylthiophenyloxy groups.

Examples of the substituted or unsubstituted arylthio groups include phenylthio, naphthylthio, alkylphenylthio, aminophenylthio, alkylaminophenylthio and alkoxyphenylthio groups.

Examples of the substituted or unsubstituted arylamino groups include anilino, N-alkylanilino, alkylphenylamino, alkoxyphenylamino and alkylaminophenylamino groups.

Usable halogens include fluorine, chlorine, bromine and iodine. Among those, chlorine is preferred.

Examples of the divalent metal represented by Met include Cu, Zn, Fe(II), Co(II), Ni(II), Ru(II), Rh(II), Pd(II), Pt(II), Mn(II), Mg(II), Be(II), Ca(II), Ba(II), Cd(II), Hg(II) and Sn(II). Examples of the monosubstituted trivalent metal include Al-Cl, Al-Br, Al-F, Al-I, Ga-Cl, Ga-F, Ga-I, Ga-Br, In-Cl, In-Br, In-I, In-F, Tl-Cl, Tl-Br, Tl-I, Tl-F, Al-C$_6$H$_5$, Al-C$_6$H$_4$CH$_3$, In-C$_6$H$_5$, In-C$_6$H$_4$CH$_3$, In-C$_{10}$H$_7$ and Mn(OH).

Examples of the disubstituted tetravalent metal include CrCl$_2$, SiCl$_2$, SiBr$_2$, SiF$_2$, ZrCl$_2$, SiI$_2$, GeCl$_2$, GeBr$_2$, GeI$_2$, GeF$_2$, SnCl$_2$, SnBr$_2$, SnI$_2$, SnF$_2$, TiCl$_2$, TiBr$_2$ and TiF$_2$; Si(OH)$_2$, Ge(OH)$_2$, Zr(OH)$_2$, Mn(OH)$_2$ and Sn(OH)$_2$; TiR$_2$, CrR$_2$, SiR$_2$, SnR$_2$ and GeR$_2$ where R is an alkyl, phenyl or naphthyl group or a derivative thereof; Si(OR')$_2$, Sn(OR')$_2$, Ge(OR')$_2$, Ti(OR')$_2$ and Cr(OR')$_2$ where R' is an alkyl, phenyl, naphthyl, trialkylsilyl or dialkylalkoxysilyl group or a derivative thereof; and Sn(SR'')$_2$ and Ge(SR'')$_2$ where R'' is an alkyl, phenyl or naphthyl group or a derivative thereof.

Examples of the oxymetal group include VO, MnO and TiO.

Now, recording and display materials using the near-infrared absorbents of the present invention will be described hereinbelow.

In optical recording media containing 1,2-naphthalocyanine derivatives of formula (I) in the recording layer thereof, it is preferable that the 1,2-naphthalocyanine derivatives contained in the recording layer are compounds having a substituent group at the α-position of each naphthalene ring as represented by the formula (II)

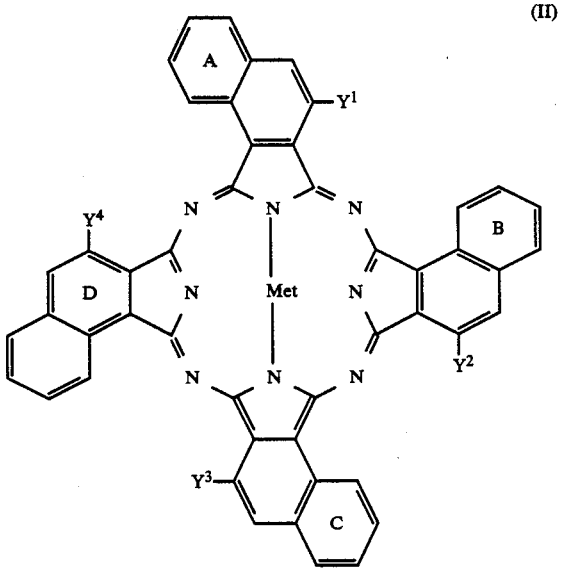

(II)

where $Y^1$, $Y^2$, $Y^3$ and $Y^4$ independently represent alkyl groups, alkoxy groups, aryloxy groups, alkylthio groups, arylthio groups or aralkyl groups, and each of these substituent groups may be substituted with one or more halogen atoms, alkoxy groups, alkoxyalkoxy groups, aryloxy groups, alkylthio groups, arylthio groups or cycloalkyl groups.

It is natural that, at positions other than the α-position, each naphthalene ring may also have substituents similar to those defined for formula (I).

Examples of alkyl groups suitable for use as the α-substituent groups include straight-chain or branched hydrocarbon radicals having 4 to 20 carbon atoms, such as butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, benzyl, 4-butylbenzyl, 4-octylbenzyl, 4-cyclohexylbenzyl, 4-butylcyclohexylbenzyl, phenetyl and cyclohexylmethyl groups.

Examples of alkoxy groups suitable for use as the α-substituent groups include butoxy, 3-ethylpropoxy, hexyloxy, octyloxy, undecyloxy, methoxyethoxy, ethoxyethoxy, butoxyethoxy, ethoxypropoxy, phenoxyethoxy, ethoxyethoxyethoxy, methoxyethoxyethoxyethoxy, methoxypropoxypropoxy, cyclohexyloxy and 4-butylcyclohexyloxy groups.

Examples of alkylthio groups suitable for use as the α-substituent groups include butylthio, hexylthio, octylthio, nonylthio, cyclohexylthio, 4-butylcyclohexylthio, ethoxyethylthio and 2,3-diethoxypropylthio groups.

Examples of aryloxy groups suitable for use as the α-substituent groups include aryloxy groups having a total of 7 to 20 carbon and oxygen atoms, such as phenoxy, 4-butylphenoxy, 3,4-dibutylphenoxy, 4-octylphenoxy, nonylphenoxy, naphthoxy, butylnaphthoxy and 4-butylcyclohexylphenoxy groups.

Examples of arylthio groups suitable for use as the α-substituent groups include arylthio groups having a total of 7 to 20 carbon and sulfur atoms, such as phenylthio, 4-butylphenylthio, octylphenylthio, naphthylthio and butylnaphthylthio groups.

In order to produce optical recording media using near-infrared absorbents in accordance with the present invention, the near-infrared absorbents may be coated or vacuum-evaporated onto transparent substrates. According to one coating process, 0.05 to 20% by weight, preferably 0.5 to 20% by weight, of the near-infrared absorbent and up to 20% by weight, preferably 0%, of a binder resin are dissolved in a solvent, and the resulting solution is applied to a substrate by means of a spin coater. According to one vacuum evaporation process, the near-infrared absorbent is deposited on a substrate at a pressure of $10^{-7}$ to $10^{-5}$ torr and a temperature of 100 to 300° C.

The said substrate may be formed of any optically transparent resin. Suitable resins include, for example, acrylic resins, polyethylene resin, vinyl chloride resin, vinylidene chloride resin, polycarbonate resins, ethylene resin, polyolefin copolymer resins, vinyl chloride copolymer resins, vinylidene chloride copolymer resins and styrene copolymer resins.

Moreover, the substrate may be surface-treated with a thermosetting or ultraviolet-curable resin.

Solvents suitable for coating purposes include, for example, halogenated hydrocarbons such as dichloromethane, chloroform, carbon tetrachloride, tetrachloroethylene and dichlorodifluoroethane; ethers such as tetrahydrofuran and diethyl ether; ketones such as acetone and methyl ethyl ketone; alcohols such as methanol, ethanol and propanol; cellosolves such as methyl cellosolve and ethyl cellosolve; and hydrocarbons such as hexane, cyclohexane, octane, benzene, toluene and xylene.

In order to produce near-infrared absorption filters using 1,2-naphthalocyanine derivatives of formula (I), various methods may be employed. For example, this can be accomplished by mixing a resin with the compound of formula (I) and molding the mixture; by pouring a mixture of a resin monomer and the compound of formula (I) into a mold and polymerizing the monomer; by dyeing a resin molding with the compound of formula (I); or by coating or vacuum-evaporating the compound of formula (I) onto a surface of a substrate material.

As the base material of such filters, there may be used any transparent resin. Suitable resins include, for example, thermoplastic resins such as polystyrene, polymethyl methacrylate, polycarbonates, polyethylene and polypropylene; and thermosetting resins such as CR-39 (a product of PPG Ind.), MR-3 (a product of Mitsui-Toatsu Chemicals Co., Ltd.) and MR-6 (a product of Mitsui-Toatsu Chemicals Co., Ltd.).

Furthermore, display materials can be produced by mixing 1,2-naphthalocyanine derivatives of formula (I) with liquid crystal materials such as nematic liquid crystals, smectic liquid crystals and cholesteric liquid crystals. These display materials may be used in guest-host type displays, liquid crystal panels (in which a near-infrared absorbent is incorporated in the liquid crystal and an image is written with a laser beam), and the like.

The present invention is further illustrated by the following examples.

Example 1

Twenty-five (25) parts by weight of 6-amyl-1,2-dicyanonaphthalene and 5 parts by weight of copper acetate were mixed with 200 parts by weight of N,N-dimethylaminoethanol and 10 parts by weight of DBU. This mixture was heated under reflux to effect reaction and then poured into a 5% aqueous solution of hydrochloric acid. The precipitated crystals were separated by filtration and purified.

The results of elemental analysis (shown in the following table) and FD mass spectrum of the compound thus obtained revealed that its molecular weight was 1,056. Thus, this compound was identified as copper tetraamyl-1,2-naphthalocyanine.

|  | C (%) | H (%) | N (%) |
|---|---|---|---|
| Calcd. | 77.28 | 6.10 | 10.60 |
| Found | 76.81 | 5.98 | 10.54 |

One (1) part by weight of the above compound was dissolved in 100 parts by weight of benzene, and the resulting solution was spin-coated onto a substrate to obtain an optical recording medium. This optical recording medium exhibited a C/N ratio of 60 dB and, moreover, had high sensitivity.

Example 2

A liquid crystal panel was made by using an alkylcyanobiphenyl liquid crystal material of the general formula

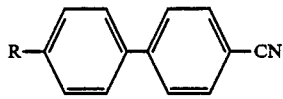

(where R is an alkyl group) and incorporating therein 0.7% by weight of the 1,2-naphthalocyanine derivative obtained in Example 1. For purposes of comparison, a liquid crystal panel in which the 1,2-naphthalocyanine derivative was not incorporated was also made. For both liquid crystal panels, the thickness of the liquid crystal layer was 10 μm.

The liquid crystal panel of the present invention gave a greater writing line width than the conventional liquid crystal panel. When the laser output was 20 mW, the liquid crystal panel of the present invention permitted the light pen to write a line of 160 μm width at a light pen traveling speed of 2 cm/sec.

The said 1,2-naphthalocyanine derivative could be dissolved in the alkylcyanobiphenyl liquid crystal material at a concentration up to about 2% by weight, and various weathering tests revealed that it had a very long life.

Specifically, the liquid crystal material containing the 1,2-naphthalocyanine derivative was filled into capsules, which were allowed to stand under direct sunlight for 100 hours. Thereafter, the liquid crystal material was examined for absorbance and absorption spectrum, but no change was observed. Thus, the 1,2-naphthalocyanine derivative was found to be very stable.

Example 3

One (1) part by weight of the 1,2-naphthalocyanine derivative obtained in Example 1 was dissolved in 10 parts by weight of chloroform, and this solution was coated onto a glass substrate to form a near-infrared absorption filter. This filter had excellent weather resistance.

Example 4

Twenty-five (25) parts by weight of 3-hexyl-4-methyl-1,2-dicyanonaphthalene and 5 parts by weight of nickel acetate were mixed with 200 parts by weight of N,N-dimethylaminoethanol and 10 parts by weight of DBU. This mixture was heated under reflux to effect reaction and then poured into a 5% aqueous solution of hydrochloric acid. The precipitated crystals were separated by filtration and purified.

The results of elemental analysis of the compound thus obtained are shown in the following table. Moreover, its FD mass spectrum revealed that its molecular weight was 1,164. Thus, this compound was identified as nickel tetrahexyl-tetramethyl-1,2-naphthalocyanine.

|  | C (%) | H (%) | N (%) |
|---|---|---|---|
| Calcd. | 78.41 | 6.93 | 9.62 |
| Found | 78.91 | 6.89 | 9.58 |

One (1) part by weight of the above compound was dissolved in 100 parts by weight of benzene, and the resulting solution was spin-coated onto a substrate to obtain an optical recording medium. This optical recording medium exhibited a C/N ratio of 60 dB and, moreover, had high sensitivity.

Example 5

Twenty-five (25) parts by weight of 3-octyl-1,2-dicyanonaphthalene and 5 parts by weight of vanadium trichloride were mixed with 50 parts by weight of 1-chloronaphthalene. This mixture was heated at 230° C. to effect reaction and then poured into a 50% aqueous solution of ethanol. The precipitated solid was separated by silica gel chromatography to obtain tetraoctyl-vanadyloxynaphthalocyanine.

The chemical structure of the compound thus obtained was confirmed on the basis of its elemental analysis (following table) and its FD mass spectrum (M.W. 1,228).

|  | C (%) | H (%) | N (%) |
|---|---|---|---|
| Calcd. | 78.21 | 7.22 | 9.12 |
| Found | 78.30 | 7.52 | 9.08 |

One (1) part by weight of the above compound was dissolved in 100 parts by weight of benzene, and the resulting solution was spin-coated onto a substrate to obtain an optical recording medium. When a record was made with a semiconductor laser at 780 nm, this optical recording medium exhibited a C/N ratio of 60 dB at a power of 8 mW. No change was observed after the record was reproduced 1,000,000 times with a 0.5 mW beam of light. Moreover, reproduction of the record was not interfered with even after the optical recording medium was allowed to stand at a temperature of 80° C. and a relative humidity of 80% for 1,000 hours.

Example 6

Twenty-five (25) parts by weight of 7-hexyl-1,2-dicyanonaphthalene and 6 parts by weight of vanadyloxy acetylacetonate were mixed with 200 parts by weight of N,N-dimethylaminoethanol and 10 parts by weight of DBU. This mixture was heated under reflux to effect reaction and then poured into a 5% aqueous solution of hydrochloric acid. The precipitated crystals were separated by filtration and purified.

The results of elemental analysis of the compound thus obtained are shown in the following table. Thus, this compound was identified as vanadyloxy tetrahexyl-1,2-naphthalocyanine.

|  | C (%) | H (%) | N (%) |
|---|---|---|---|
| Calcd. | 77.47 | 6.50 | 10.04 |
| Found | 77.40 | 6.39 | 9.98 |

One (1) part by weight of the above compound was dissolved in 100 parts by weight of octane, and the resulting solution was spin-coated onto a substrate to obtain an optical recording medium. This optical recording medium had high sensitivity.

Example 7

Twenty-five (25) parts by weight of 3-octyl-7-tert-butyl-1,2-naphthalenedinitrile, 6 parts by weight of vanadyl trichloride and 1 part by weight of ammonium molybdate were mixed with 100 parts by weight of chloronaphthalene. This mixture was heated under reflux to effect reaction and then subjected to silica gel chromatography using a mixture of benzene and hexane as the solvent. Thus, there was obtained 10 parts by weight of tetraoctyltetrabutyl-1,2-naphthalocyaninoxyvanadium.

The results of elemental analysis of the compound thus obtained are shown in the following table.

|  | C (%) | H (%) | N (%) |
|---|---|---|---|
| Calcd. | 79.36 | 8.32 | 7.71 |
| Found | 79.01 | 8.08 | 7.68 |

One (1) part by weight of the above compound was dissolved in 100 parts by weight of octane, and the resulting solution was spin-coated onto a substrate to obtain an optical recording medium. This optical recording medium had high reflectance, sensitivity and stability.

Example 8

Twenty-five (25) parts by weight of 7-ethoxy-4-methyl-1,2-dicyanonaphthalene and 5 parts by weight of nickel acetate were mixed with 200 parts by weight of N,N-dimethylaminoethanol and 10 parts by weight of DBU. This mixture was heated under reflux to effect reaction and then poured into a 5% aqueous solution of hydrochloric acid. The precipitated crystals were separated by filtration and purified.

The results of elemental analysis of the compound thus obtained are shown in the following table.

|  | C (%) | H (%) | N (%) |
|---|---|---|---|
| Calcd. | 71.79 | 4.82 | 11.16 |
| Found | 71.90 | 4.88 | 10.92 |

Five (5) parts by weight of the above compound was mixed with 1,000 parts by weight of a polycarbonate resin, and the resulting mixture was hot-molded to form a filter. This filter effectively absorbed light in the wavelength range of 700 to 850 nm.

Example 9

Twenty-five (25) parts by weight of 3-octyloxy-1,2-dicyanonaphthalene and 5 parts by weight of vanadium trichloride were mixed with 500 parts by weight of chloronaphthalene. This mixture was heated to effect reaction. Then, the reaction product was washed with ethanol and an aqueous solution of hydrochloric acid to obtain tetraoctylvanadyloxynaphthalocyanine.

The results of elemental analysis of the compound thus obtained are shown in the following table.

|  | C (%) | H (%) | N (%) |
|---|---|---|---|
| Calcd. | 74.34 | 6.86 | 8.67 |
| Found | 74.02 | 6.90 | 8.59 |

Five (5) parts by weight of the above compound was mixed with 1,000 parts by weight of a polystyrene resin, and the resulting mixture was hot-molded to form a filter. This filter effectively absorbed light in the wavelength range of 700 to 850 nm.

Example 10

Twenty-five (25) parts by weight of 3-phenylthio-7-hexyl-1,2-dicyanonaphthalene and 6 parts by weight of vanadyloxy acetylacetonate were mixed with 200 parts by weight of N,N-dimethylaminoethanol and 10 parts by weight of DBU. This mixture was heated under reflux to effect reaction and then poured into a 5% aqueous solution of hydrochloric acid. The precipitated crystals were separated by filtration and purified.

The results of elemental analysis of the compound thus obtained are shown in the following table. Thus, this compound was identified as vanadiumoxy tetraphenylthiotetrahexyl-1,2-naphthalocyanine.

|  | C (%) | H (%) | N (%) |
|---|---|---|---|
| Calcd. | 74.44 | 5.73 | 7.27 |
| Found | 74.32 | 5.84 | 7.01 |

Two (2) parts by weight of the above compound was mixed with 100 parts by weight of a polyester resin, and the resulting mixture was hot-molded to form a film. This film effectively absorbed light in the wavelength range of 700 to 850 nm.

With regard to some of the compounds obtained in the foregoing examples, the absorption maximum ($\alpha_{max}$) of each compound in solution and in film form, the maximum reflectance of each compound in film form, and the durability of each compound were evaluated. The results thus obtained are shown in Table 1. In addition, the results of three comparative examples in which conventional absorbents were evaluated in the same manner are also shown in Table 1.

TABLE 1

|  | $\lambda_{max}$ | | Maximum reflectance (6) (nm)/(%) | Moisture resistance | Thermal resistance |
|---|---|---|---|---|---|
|  | Solution (4) | Film (6) |  |  |  |
| [Compounds of the invention] | | | | | |
| Example 1 | 710 | 755 | 760/22 | | |
| Example 4 | 710 | 750 | 800/26 | | |
| Example 5 | 730 | 765 | 800/31 | | |
| Example 6 | 740 | 760 | 780/27 | | |
| [Conventional absorbents] | | | | | |
| Comparative Example 1 (1) | 806 | 820 | 830/15 | | |
| Comparative Example 2 (2) | 740 | 780 | 830/25 | X | X |
| Comparative | 678 (5) | 710 (7) | 720/35 (7) | | |

TABLE 1-continued

| | $\lambda_{max}$ | | Maximum reflectance (6) (nm)/(%) | Moisture resistance | Thermal resistance |
|---|---|---|---|---|---|
| | Solution (4) | Film (6) | | | |
| Example 3 (3) | | | | | |

Notes:
(1) An absorbent which is described in Japanese Patent Laid-Open No. 25886/'86 (Example 1).

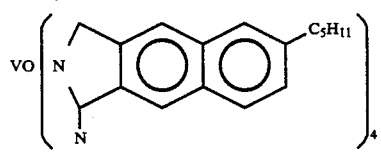

(2) An absorbent which is described in Japanese Patent Laid-Open No. 112790/'83 (Example 3).

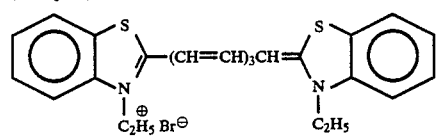

(3) An absorbent which is described in Japanese Patent Laid-Open No. 36490/'83.

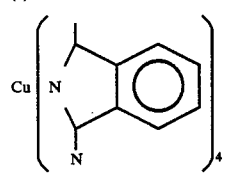

(4) A chloroform solution.
(5) A chloronaphthalene solution.
(6) The light reflected from a spin-coated film was measured at an angle of 5°.
(7) A film formed by vacuum evaporation.

Examples 11 to 82

In these examples, there were used a total of 50 intermediates (Intermediates 1 to 50 shown in Table 2) of the general formula (V)

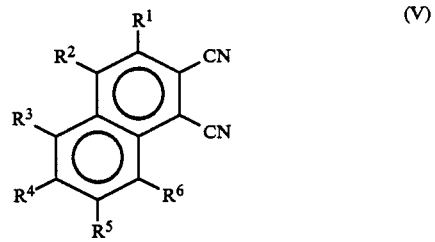

Using 1 to 4 of these intermediates, a variety of 1,2-naphthalocyanine derivatives were synthesized in the same manner as described in the foregoing examples. The intermediate(s), metal and reaction conditions used in each example, together with the absorption maximum ($\lambda_{max}$) of the resulting compound in solution, are shown in Table 3.

TABLE 2

| Intermediate | $R^1$ | $R^2$ | $R^3$ | $R^4$ | $R^5$ | $R^6$ |
|---|---|---|---|---|---|---|
| 1 | n-$C_8H_{17}$ | H | H | H | H | H |
| 2 | $C_4H_9$ | $CH_3$ | H | H | $C_5H_{11}$ | H |
| 3 | tert-$C_4H_9$ | H | H | —$C_4H_9$ | H | H |
| 4 | n-$C_{14}H_{29}$ | H | H | H | H | $CH_3$ |
| 5 | —$C_2H_4C_6H_5$ | H | H | H | H | H |
| 6 | —$CH_2C_6H_4C(CH_3)_3$ | H | H | H | H | H |
| 7 | —$CH_2C_6H_4C_6H_{10}C(CH_3)_3$ | H | H | —$CH_2\underset{\underset{CH_3}{\mid}}{C}HCH_2\underset{\underset{CH_3}{\mid}}{C}HCH_3$ | H | H |
| 8 | $C_6H_{13}$ | —$C_7H_{15}$ | H | $C_2H_5$ | H | H |
| 9 | $C_6H_{13}$ | H | H | —$C_8H_{17}$ | H | H |
| 10 | H | H | H | —$CH_2C_6H_{10}C_4H_9$ | H | H |
| 11 | H | H | H | —$C_6H_{10}C_4H_7$— | H | H |
| 12 | —$CH_2C_6H_5$ | H | H | H | H | H |
| 13 | n-$C_6H_{13}$ | $C_4H_9$ | H | H | H | H |
| 14 | —$C_4H_8$— | | H | H | H | H |
| 15 | $C_2H_5$ | $C_2H_5$ | H | $C_2H_5$ | H | H |
| 16 | H | H | $C_6H_{13}$ | H | $C_2H_5$ | H |
| 17 | H | H | H | H | H | $C_8H_{17}$ |
| 18 | cyclo-$C_6H_{11}$ | H | H | H | H | H |
| 19 | H | H | $CH_2C_6H_5$ | H | —$C_{10}H_{21}$ (mix) | H |
| 20 | —$CH_2C_6H_5$ | H | H | H | tert-$C_4H_9$ | H |
| 21 | —$CH_2CHC_4H_9$—$CH_2CH_2$— | H | H | H | H | H |
| 22 | —$C_{20}H_{41}$ | H | H | H | H | H |
| 23 | H | $CH_3$ | $CH_3$ | H | $CH_3$ | $CH_3$ |
| 24 | H | $C_2H_5$ | H | H | $C_2H_5$ | $C_7H_{15}$ |
| 25 | H | H | H | H | $CH_3$ | $CH_3$ |
| 26 | $OCH_3$ | H | H | H | H | H |
| 27 | $OC_8H_{17}(n)$ | H | H | H | H | H |
| 28 | $OCH_2$—$C_6H_5$ | H | H | H | H | H |
| 29 | $OCH_2CH_2C_6H_5$ | H | H | H | H | $OCH_3$ |
| 30 | $OCH_2C_6H_5C_6H_{11}$ | H | $OCH_3$ | H | H | H |
| 31 | $OCH_2CH_2\underset{\underset{CH_3}{\mid}}{C}HCH_2C(CH_3)_3$ | H | H | H | $OCH_3$ | H |
| 32 | $OC_2H_4OC_2H_4OC_2H_5$ | H | H | H | $OC_8H_{17}$ | H |
| 33 | H | H | H | H | $OCH_2C_6H_5$ | H |
| 34 | H | $OCH_3$ | H | H | H | H |
| 35 | H | H | H | H | —$OCH_2CH_2O$— | H |
| 36 | $C_8H_{17}$ | H | H | H | $OC_2H_5$ | H |
| 37 | $C_8H_{17}$ | H | H | H | —O—$CH_2$—O— | H |

TABLE 2-continued

| Intermediate | $R^1$ | $R^2$ | $R^3$ | $R^4$ | $R^5$ | $R^6$ |
|---|---|---|---|---|---|---|
| 38 | —CH$_2$CH(C$_4$H$_9$)CH$_2$CH$_2$— | H | H | | OC$_8$H$_{17}$ | H |
| 39 | C$_4$H$_9$ | H | H | OC$_4$H$_9$ | OC$_4$H$_9$ | H |
| 40 | C$_8$H$_{17}$ | H | H | —O—CH$_2$CH$_2$O— | | H |
| 41 | SCH$_3$ | H | H | H | SCH$_3$ | H |
| 42 | SC$_8$H$_{17}$(n) | H | H | H | H | SCH$_3$ |
| 43 | SC$_6$H$_5$C$_4$H$_9$ | H | H | H | H | H |
| 44 | SC$_{10}$H$_7$ | H | H | H | H | H |
| 45 | SC$_4$H$_9$ | H | H | H | Cl | Cl |
| 46 | SC$_5$H$_{11}$ | SCH$_3$ | H | H | H | H |
| 47 | SC$_2$H$_4$SC$_2$H$_4$SC$_2$H$_5$ | H | H | H | H | H |
| 48 | SC$_2$H$_4$OC$_2$H$_5$ | H | H | H | H | H |
| 49 | N(C$_8$H$_{17}$)$_2$ | H | H | H | H | H |
| 50 | N(C$_6$H$_5$)$_2$ | H | H | H | H | H |

TABLE 3

| Example | Intermediate | Metal | Reaction conditions | $\lambda_{max}$ |
|---|---|---|---|---|
| 11 | 1 | Zn(acac)$_2$ | Refluxed in N,N-dimethylaminoethanol/DBU. | 710 |
| 12 | 1 | CuCl | Refluxed in N,N-dimethylaminoethanol/DBU. | 703 |
| 13 | 1 | Ni(OAc)$_2$ | Refluxed in N,N-dimethylaminoethanol/DBU. | 703 |
| 14 | 1 | Co(OAc)$_2$ | Refluxed in N,N-dimethylaminoethanol/DBU. | 703 |
| 15 | 2 | Ni(OAc)$_2$ | Refluxed in N,N-dimethylaminoethanol/DBU. | 702 |
| 16 | 2 | FeCl$_3$ | Refluxed in N,N-dimethylaminoethanol/DBU. | 702 |
| 17 | 2 | Na | Refluxed in N,N-dimethylaminoethanol/DBU. | 702 |
| 18 | 2 | H$_2$ | The compound of Example 17 was hydrolyzed. | 720 |
| 19 | 1,3 | VO(acac) | Heated at 200° C. in urea. | 720 |
| 20 | 1 | SiCl$_4$ | Reacted in quinoline/tributylamine/DBU. | 710 |
| 21 | 1 | SnCl$_4$ | Reacted in quinoline/tributylamine/DBU. | 715 |
| 22 | 1 | | The compound of Example 20 was hydrolyzed. | 710 |
| 23 | 1 | | The compound of Example 21 was hydrolyzed. | 712 |
| 24 | 1 | | The compound of Example 20 was reacted with PhMgBr. | 713 |
| 25 | 1 | | The compound of Example 22 was reacted with (CH$_3$)$_3$CCH$_2$CH(CH$_3$)CH$_2$COCl. | 740 |
| 26 | 1 | | The compound of Example 22 was reacted with trimethylsilyl chloride. | 710 |
| 27 | 1 | | The compound of Example 23 was reacted with trimethylsilyl chloride. | 715 |
| 28 | 1 | GeCl$_4$ | Reacted in quinoline/tributylamine/DBU. | 712 |
| 29 | 1 | | The compound of Example 28 was hydrolyzed. | 715 |
| 30 | 1 | | The compound of Example 29 was reacted with thiophenol. | 712 |
| 31 | 3 | TiCl$_4$ | Reacted in quinoline/DBU. | 720 |
| 32 | 4 | AlCl$_3$ | Reacted in quinoline/DBU. | " |
| 33 | 5 | Cr(OAc)$_3$ | Reacted in quinoline/DBU. | " |
| 34 | 6 | PdCl$_3$ | Refluxed in N,N-dimethylaminoethanol. | 710 |
| 35 | 7 | RhCl$_3$ | Refluxed in N,N-dimethylaminoethanol. | " |
| 36 | 8 | CuCl | Refluxed in N,N-dimethylaminoethanol. | 700 |
| 37 | 9 | " | Refluxed in N,N-dimethylaminoethanol. | 700 |
| 38 | 10 | MnCl$_2$ | Refluxed in N,N-dimethylaminoethanol. | 800 |
| 39 | 11 | Mn(OAc)$_2$ | Refluxed in N,N-dimethylaminoethanol. | 800 |
| 40 | 12 | Mn(acac)$_2$ | Refluxed in N,N-dimethylaminoethanol. | 810 |
| 41 | 13 | VO(acac)$_2$ | Refluxed in N,N-dimethylaminoethanol. | 718 |
| 42 | 14 | " | Refluxed in N,N-dimethylaminoethanol. | 715 |
| 43 | 15 | " | Refluxed in N,N-dimethylaminoethanol. | 721 |
| 44 | 1,2,3,4 | " | Refluxed in N,N-dimethylaminoethanol. | 720 |
| 45 | 16 | " | Refluxed in N,N-dimethylaminoethanol. | 715 |
| 46 | 17 | " | Refluxed in N,N-dimethylaminoethanol. | 720 |
| 47 | 18 | VCl$_3$ | Refluxed in chloronaphthalene for 3 hours. | 719 |
| 48 | 19 | " | Refluxed in chloronaphthalene for 3 hours. | 710 |
| 49 | 20 | " | Refluxed in chloronaphthalene for 3 hours. | 718 |
| 50 | 21 | " | Refluxed in chloronaphthalene for 3 hours. | 720 |
| 51 | 22 | " | Refluxed in chloronaphthalene for 3 hours. | 720 |
| 52 | 23 | " | Refluxed in chloronaphthalene for 3 hours. | 710 |
| 53 | 24 | " | Refluxed in chloronaphthalene for 3 hours. | 709 |
| 54 | 25 | " | Refluxed in chloronaphthalene for 3 hours. | 709 |
| 55 | 26 | " | Refluxed in chloronaphthalene for 3 hours. | 750 |
| 56 | 27 | " | Refluxed in chloronaphthalene for 3 hours. | 750 |
| 57 | 28 | " | Refluxed in chloronaphthalene for 3 hours. | 748 |
| 58 | 29 | " | Refluxed in chloronaphthalene for 3 hours. | 755 |
| 59 | 30 | " | Refluxed in chloronaphthalene for 3 hours. | 755 |
| 60 | 31 | " | Refluxed in chloronaphthalene for 3 hours. | 760 |
| 61 | 32 | " | Refluxed in chloronaphthalene for 3 hours. | 760 |
| 62 | 33 | " | Refluxed in chloronaphthalene for 3 hours. | 735 |
| 63 | 34 | " | Refluxed in chloronaphthalene for 3 hours. | 730 |
| 64 | 35 | " | Refluxed in chloronaphthalene for 3 hours. | 730 |
| 65 | 36 | " | Refluxed in chloronaphthalene for 3 hours. | 740 |
| 66 | 37 | " | Refluxed in chloronaphthalene for 3 hours. | 740 |
| 67 | 38 | " | Refluxed in chloronaphthalene for 3 hours. | 735 |

TABLE 3-continued

| Example | Inter-mediate | Metal | Reaction conditions | $\lambda_{max}$ |
|---|---|---|---|---|
| 68 | 39 | " | Refluxed in chloronaphthalene for 3 hours. | 740 |
| 69 | 40 | " | Refluxed in chloronaphthalene for 3 hours. | 740 |
| 70 | 41 | " | Refluxed in chloronaphthalene for 3 hours. | 785 |
| 71 | 42 | " | Refluxed in chloronaphthalene for 3 hours. | 785 |
| 72 | 43 | " | Refluxed in chloronaphthalene for 3 hours. | 785 |
| 73 | 44 | " | Refluxed in chloronaphthalene for 3 hours. | 780 |
| 74 | 45 | " | Refluxed in chloronaphthalene for 3 hours. | 780 |
| 75 | 46 | " | Refluxed in chloronaphthalene for 3 hours. | 785 |
| 76 | 47 | " | Refluxed in chloronaphthalene for 3 hours. | 780 |
| 77 | 48 | " | Refluxed in chloronaphthalene for 3 hours. | 780 |
| 78 | 49 | " | Refluxed in chloronaphthalene for 3 hours. | 800 |
| 79 | 50 | " | Refluxed in chloronaphthalene for 3 hours. | 800 |
| 80 | 27 | CuCl | Refluxed in chloronaphthalene/DBU. | 720 |
| 81 | 27 | NiCl$_2$ | Refluxed in chloronaphthalene/DBU. | 720 |
| 82 | 44 | CuCl | Refluxed in chloronaphthalene/DBU. | 750 |

As described above, the near-infrared absorbents of the present invention have excellent moisture resistance, thermal resistance and light resistance, as well as good compatibility with various resins. Moreover, recording and display materials using the near-infrared absorbents of the present invention have high sensitivity and good durability.

What is claimed is:

1. A near-infrared absorbent, comprising 1,2-naphthalocyanine derivatives having a substituent group at the α-position of each naphthalene ring as represented by the formula (II):

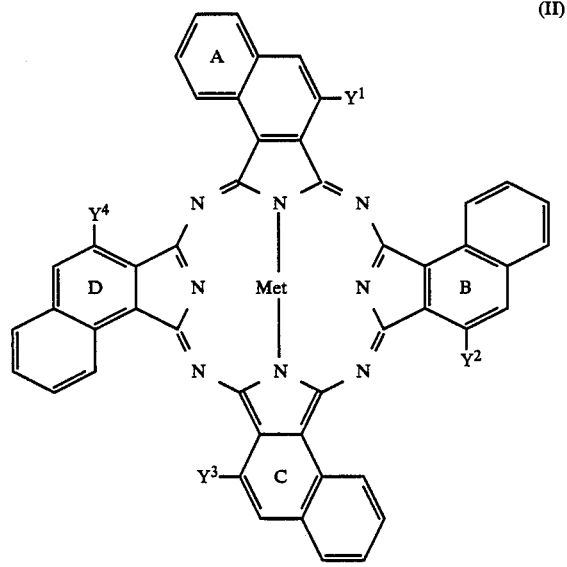

wherein the naphthalene rings represented by A, B, C and D are, independently, substituted with 0–5 substituents selected from alkyl, alkoxy, alkylthio, monoalkylamino, dialkylamino, aryl, aryloxy, arylthio, arylamino groups and halogen atoms; any two adjacent substituents on a naphthalene ring may be bonded to form a ring; Met is two hydrogen atoms, a divalent metal atom, a monosubstituted trivalent metal atom, a disubstituted tetravelent metal atom or an oxymetal group; $Y^1$, $Y^2$, $Y^3$, $Y^4$, independently, are alkyl groups, alkoxyl groups, aryloxy groups, alkylthio groups, arylthio groups and aralkyl groups; and each of these substituent groups may be substituted with one or more halogen atoms, alkoxyl groups, alkoxyalkoxyl groups, aryloxy groups, alkylthio groups, arylthio groups or cycloalkyl groups.

2. The absorbent of claim 1, wherein said alkyl on naphthalene rings A, B, C or D group is an unsubstituted alkyl group or an alkyl group substituted with one or more alkoxy, alkylthio, alkylamino, arylthio, halogen or aryl groups.

3. The absorbent of claim 1, wherein said alkoxy group on naphthalene rings A, B, C or D is an unsubstituted alkoxy group or an alkoxy group substituted with one or more oligoethyloxy, alkylamino, alkylthio or arylthio groups.

4. The absorbent of claim 1, wherein said alkylthio group on naphthalene rings A, B, C or D is an unsubstituted alkylthio group or an alkylthio group substituted with one or more oligoalkoxy, oligoalkylthio, monoalkylamino, dialkylamino or halogen groups.

5. The absorbent of claim 1, wherein said monoalkylamino and dialkylamino groups on naphthalene rings A, B, C or D are unsubstituted monoalkylamino and dialkylamino groups or monoalkylamino and dialkylamino groups substituted with hydroxy, alkoxy or acyloxy groups.

6. The absorbent of claim 1, wherein said aryl group on naphthalene rings A, B, C or D is phenyl, naphthyl, tolyl or a heterocyclic radical derived from thiophene, oxazole, thiazole, thiadiazole, furan, pyrrole, quinoline or pyridine.

7. The absorbent of claim 1, wherein said aryloxy group on naphthalene rings A, B, C or D is an unsubstituted aryloxy group or an aryloxy group substituted with one or more alkyl, alkylamino, halogen, nitro, alkoxyl or alkylthio groups.

8. The absorbent of claim 1, wherein said arylthio group on naphthalene rings A, B, C or D is an unsubstituted arylthio group or an arylthio group substituted with one or more alkyl, amino, alkylamino or alkoxyl groups.

9. The absorbent of claim 1, wherein said arylamino group on naphthalene rings A, B, C or D is an unsubstituted arylamino group or an arylamino group substituted with one or more alkyl, alkoxyl or alkylamino groups.

10. The absorbent of claim 9, wherein said arylamino group on naphthalene rings A, B, C or D substituted with one or more alkyl groups is an N-alkylanilino or alkylphenylamino group.

11. Optical recording media comprising the near-infrared absorbent of claim 1 in the recording layer thereof.

12. The optical recording media according to claim 11, wherein the total number of the oxygen, sulfur and carbon atoms present in the α-substituent groups $Y^1$, $Y^2$, $Y^3$ and $Y^4$ ranges from 4 to 20.

13. The optical recording media according to claim 11, wherein the α-substituent groups $Y^1$, $Y^2$, $Y^3$ and $Y^4$ groups, aralkyl groups, cycloalkylalkyl groups or cycloalkylaralkyl groups and the total number of the carbon atoms ranges from 4 to 20.

14. The optical recording media according to claim 13, wherein all of the substituents present at positions other than the α-position of each naphthalene ring of the 1,2-naphthalocyanine derivatives are alkyl groups, aralkyl groups, cycloalkylalkyl groups or cycloalkylaralkyl groups.

15. Near-infrared absorption filters comprising the near-infrared absorbents of claim 1.

16. Display materials comprising mixtures of the near-infrared absorbents of claim 1 and liquid crystal materials.

* * * * *